United States Patent [19]

Morton et al.

[11] Patent Number: 5,642,442
[45] Date of Patent: Jun. 24, 1997

[54] METHOD FOR LOCATING THE POSITION AND ORIENTATION OF A FIDUCIARY MARK

[75] Inventors: James S. Morton, Atlanta, Ga.; James V. Recktenwalt, New Milford, Conn.; Johannes A. S. Bjorner, Woodbury, Conn.; Kenneth A. Lais, New Fairfield, Conn.

[73] Assignee: United Parcel Services of America, Inc., Atlanta, Ga.

[21] Appl. No.: 554,321

[22] Filed: Nov. 8, 1995

Related U.S. Application Data

[63] Continuation of Ser. No. 419,176, Apr. 10, 1995, abandoned.
[51] Int. Cl.⁶ .................................................. G06K 9/20
[52] U.S. Cl. ........................ 382/287; 382/168; 382/227
[58] Field of Search ............................ 382/151, 227, 382/168, 287; 235/462, 424

[56] References Cited

U.S. PATENT DOCUMENTS

| | | | |
|---|---|---|---|
| 3,444,517 | 5/1969 | Rabinow | 382/126 |
| 3,603,728 | 9/1971 | Arimura | 178/6.8 |
| 3,801,775 | 4/1974 | Acker | 235/61.11 E |
| 3,885,229 | 5/1975 | Negita et al. | 340/146.3 |
| 4,516,265 | 5/1985 | Kizu et al. | 382/48 |
| 4,745,269 | 5/1988 | Van Gils | 235/487 |
| 4,758,716 | 7/1988 | Mayer et al. | 235/470 |
| 4,760,247 | 7/1988 | Keane et al. | 235/454 |
| 4,776,464 | 10/1988 | Miller et al. | 209/3.3 |
| 4,803,737 | 2/1989 | Sato et al. | 382/65 |
| 4,822,986 | 4/1989 | Guthmueller et al. | 235/462 |
| 4,874,936 | 10/1989 | Chandler et al. | 235/494 |
| 4,896,029 | 1/1990 | Chandler et al. | 235/494 |
| 4,924,078 | 5/1990 | Sant'Anselmo et al. | 235/494 |
| 4,955,062 | 9/1990 | Terui | 382/8 |
| 4,998,010 | 3/1991 | Chandler et al. | 235/494 |
| 5,003,613 | 3/1991 | Lovelady et al. | 382/17 |
| 5,086,478 | 2/1992 | Kelly-Mohaffey | 382/151 |
| 5,103,489 | 4/1992 | Miette | 382/48 |
| 5,138,465 | 8/1992 | Ng et al. | 358/153 |
| 5,153,418 | 10/1992 | Batterman et al. | 235/494 |
| 5,155,343 | 10/1992 | Chandler et al. | 235/462 |
| 5,185,811 | 2/1993 | Beers et al. | 382/151 |
| 5,189,292 | 2/1993 | Batterman et al. | 235/494 |
| 5,223,701 | 6/1993 | Batterman et al. | 235/474 |
| 5,241,166 | 8/1993 | Chandler | 235/494 |
| 5,276,315 | 1/1994 | Surka | 235/462 |
| 5,278,397 | 1/1994 | Barkan et al. | 235/462 |
| 5,343,028 | 8/1994 | Figarella et al. | 235/462 |

FOREIGN PATENT DOCUMENTS

2047821   2/1988   Canada.

OTHER PUBLICATIONS

Anonymous, "System for Determining Form Alignment," *IBM Technical Disclosure Bulletin*, vol. 30, No. 11, p. 57 (Apr. 1988).

Anonymous, "Registration Marks for Machine Vision," *Research Disclosure*, No. 349, p. 292 (May 1993).

*Primary Examiner*—Leo Boudreau
*Assistant Examiner*—Chris Kelley
*Attorney, Agent, or Firm*—Jones & Askew

[57] ABSTRACT

Fiduciary mark detection system usable with an over-the-belt optical character recognition (OCR) reader for ascertaining the position and orientation of text within the destination address on parcels moving along a conveyor, comprising charged coupled device (CCD) array, analog-to-digital (A/D) converter, general purpose computer, and software program. Image processing software program comprising projection histograms, convolution filtering, correlation, radial variance, first moments of inertia, edge image analysis, Hough method, detection confidence testing. Orientation defining mark comprising fluorescent ink placed approximately in the center of the destination address block on a parcel is non obstructive of the underlying text and may be affixed to parcel any time prior to scanning. Fiduciary mark comprising two circles of different diameter oriented such that a vector from the center of large circle to center of small circle is oriented in the same direction as underlying text.

32 Claims, 8 Drawing Sheets

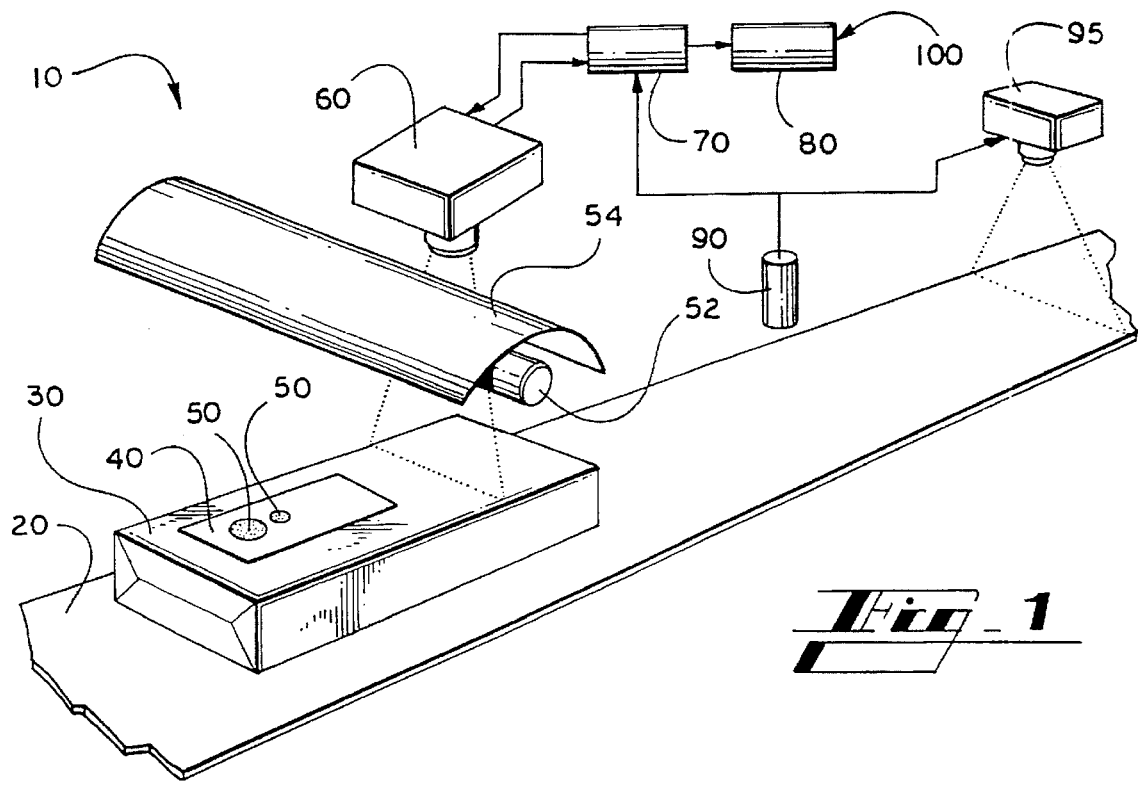
Fig_1
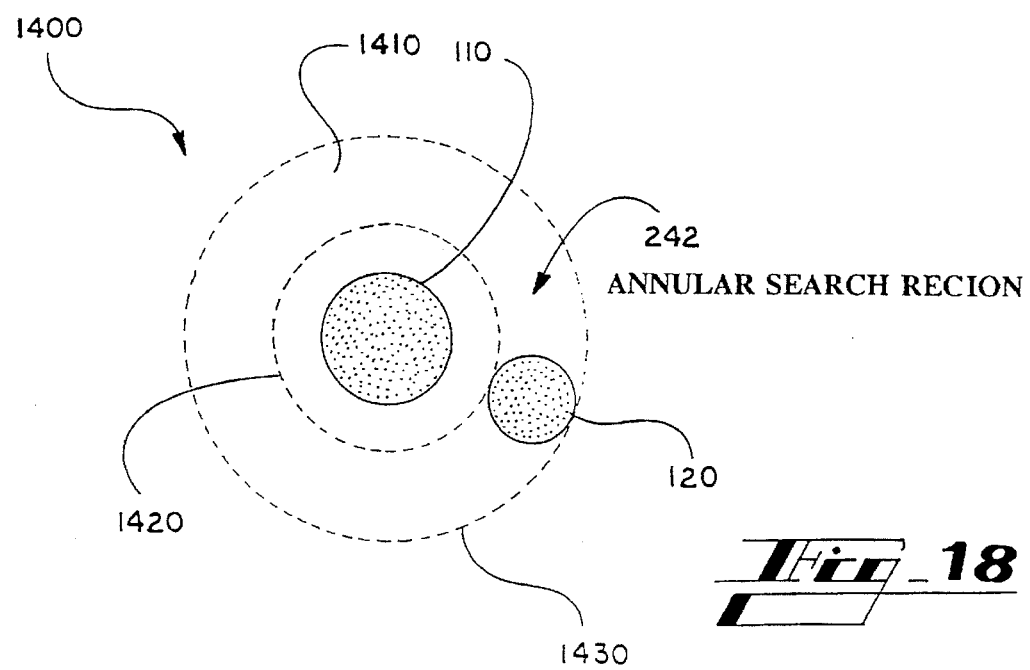
Fig_18

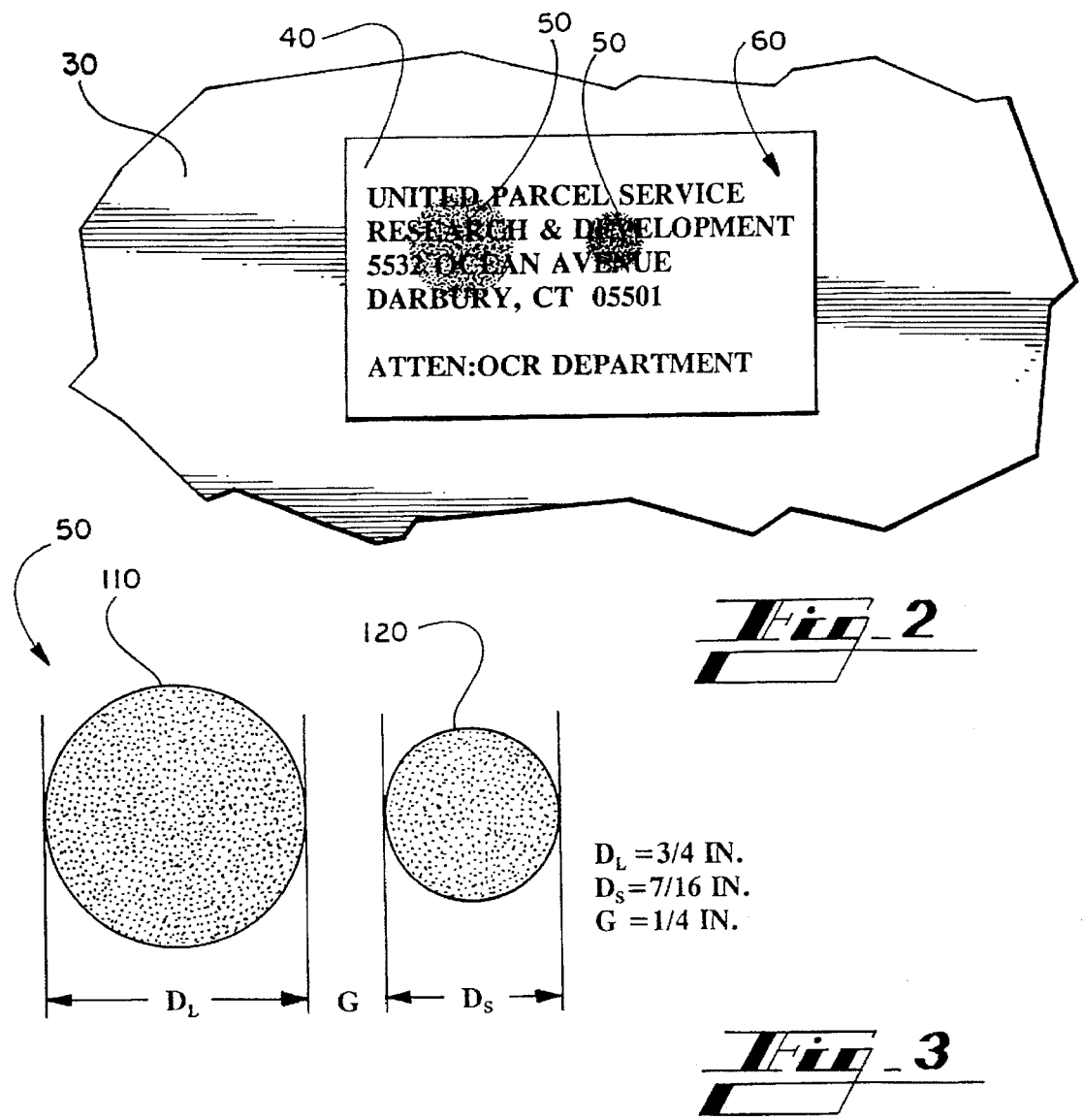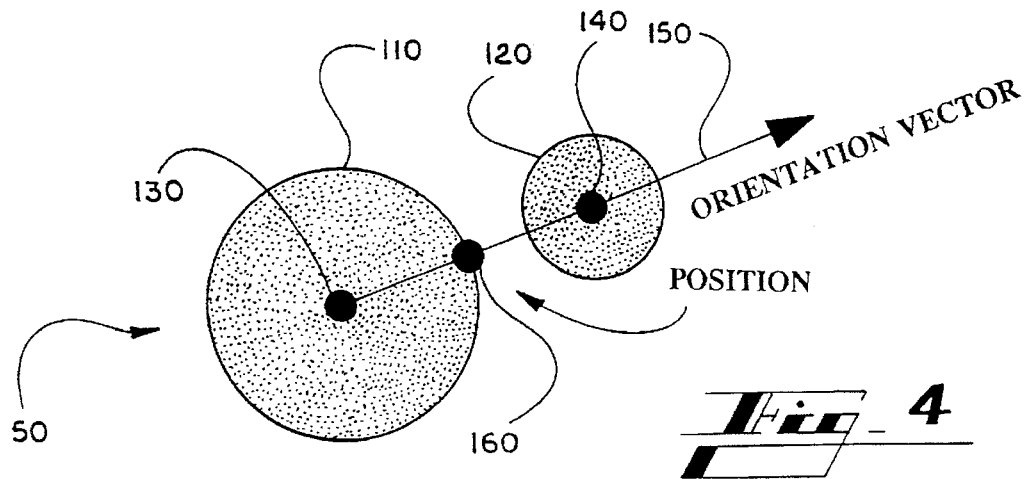

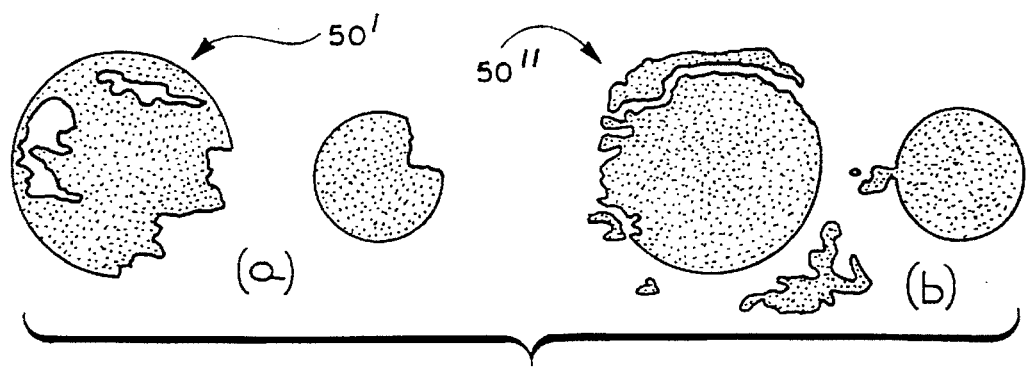
*Fig_5*
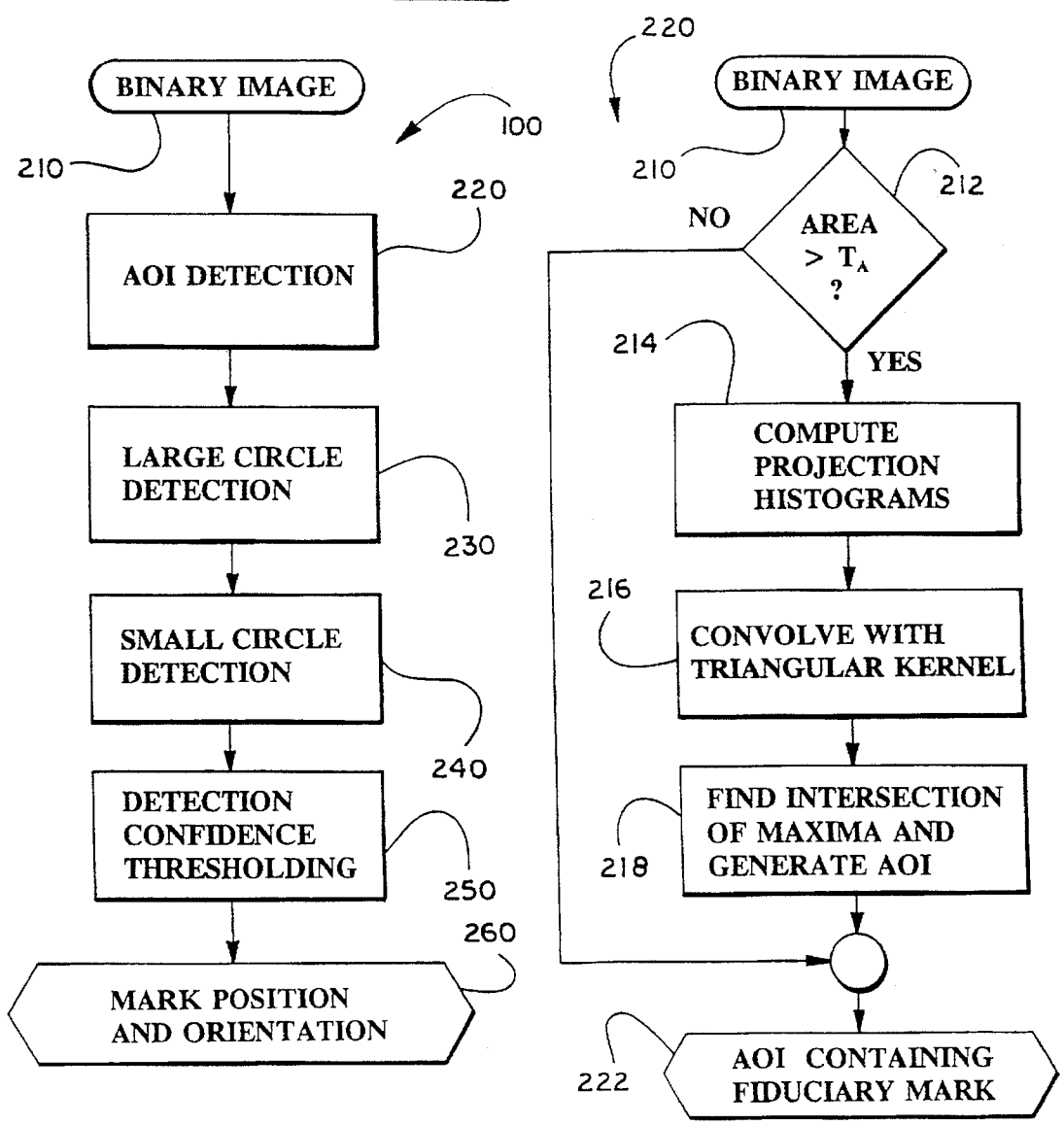
*Fig_6*      *Fig_7*

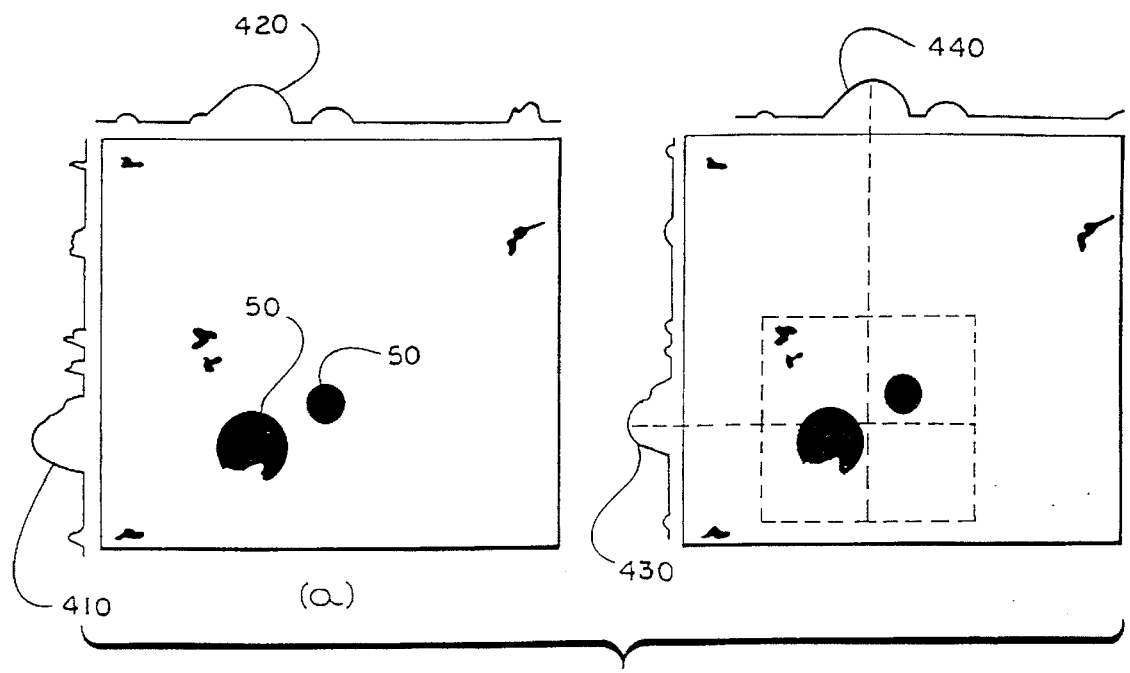
Fig_8
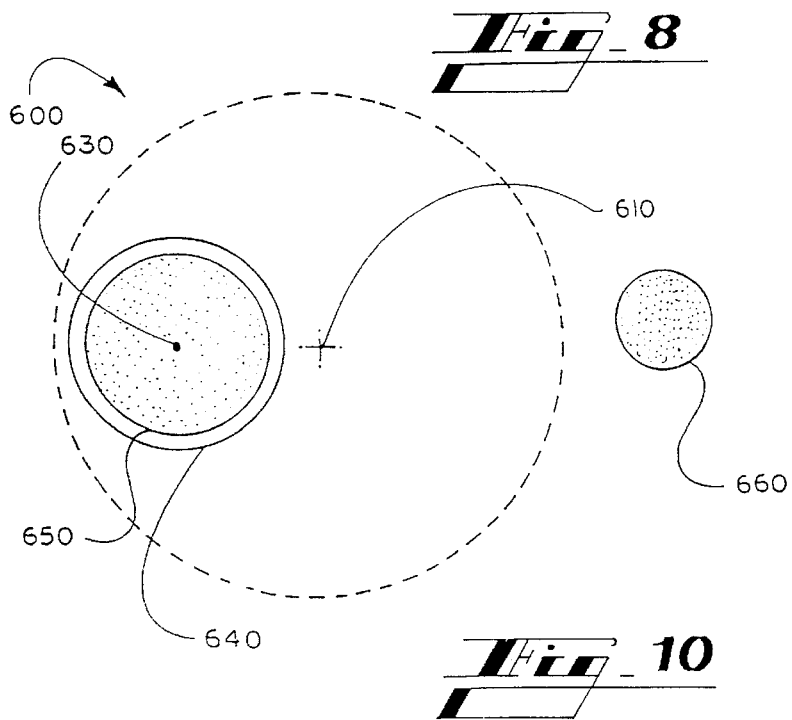
Fig_10

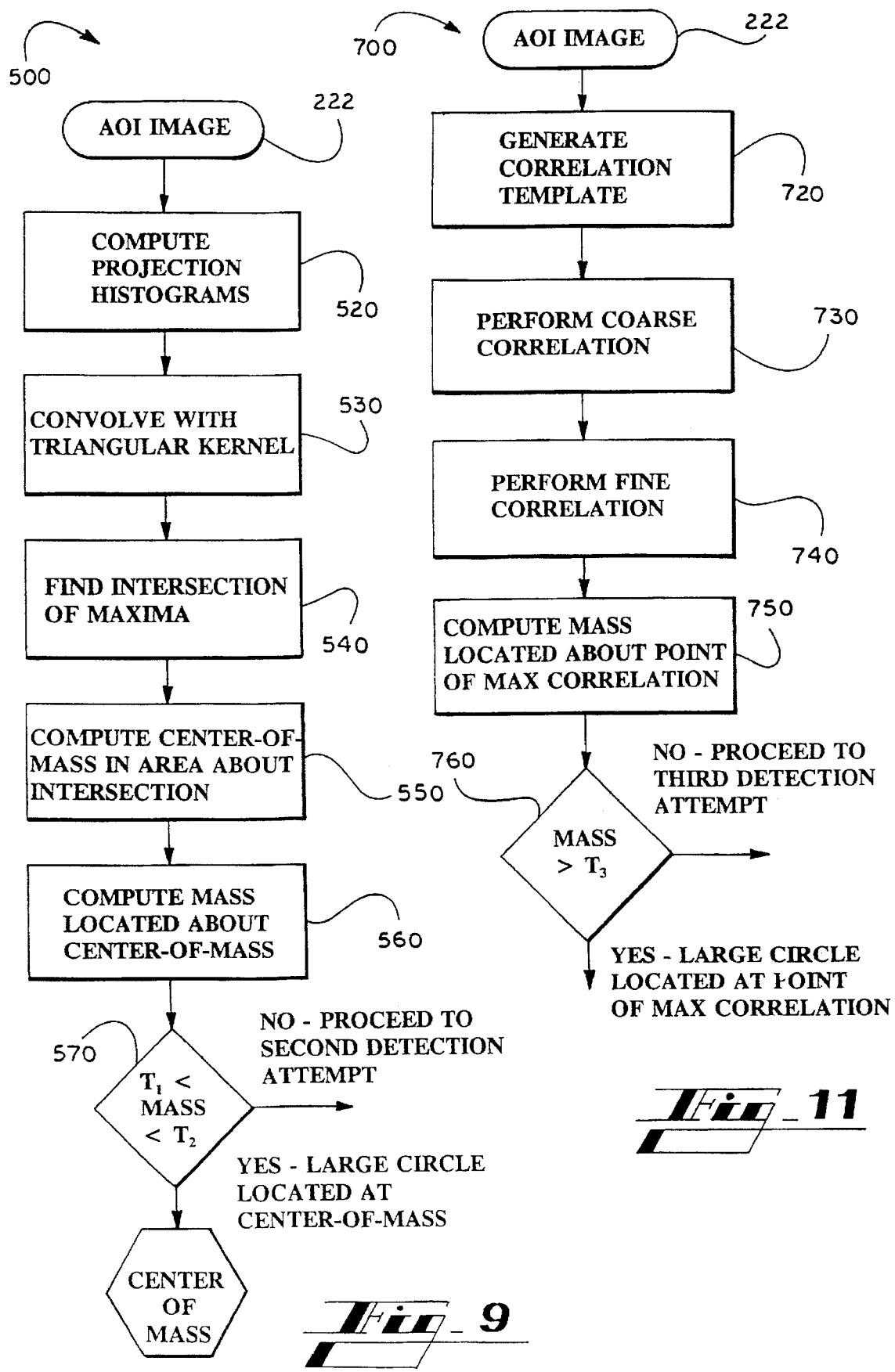

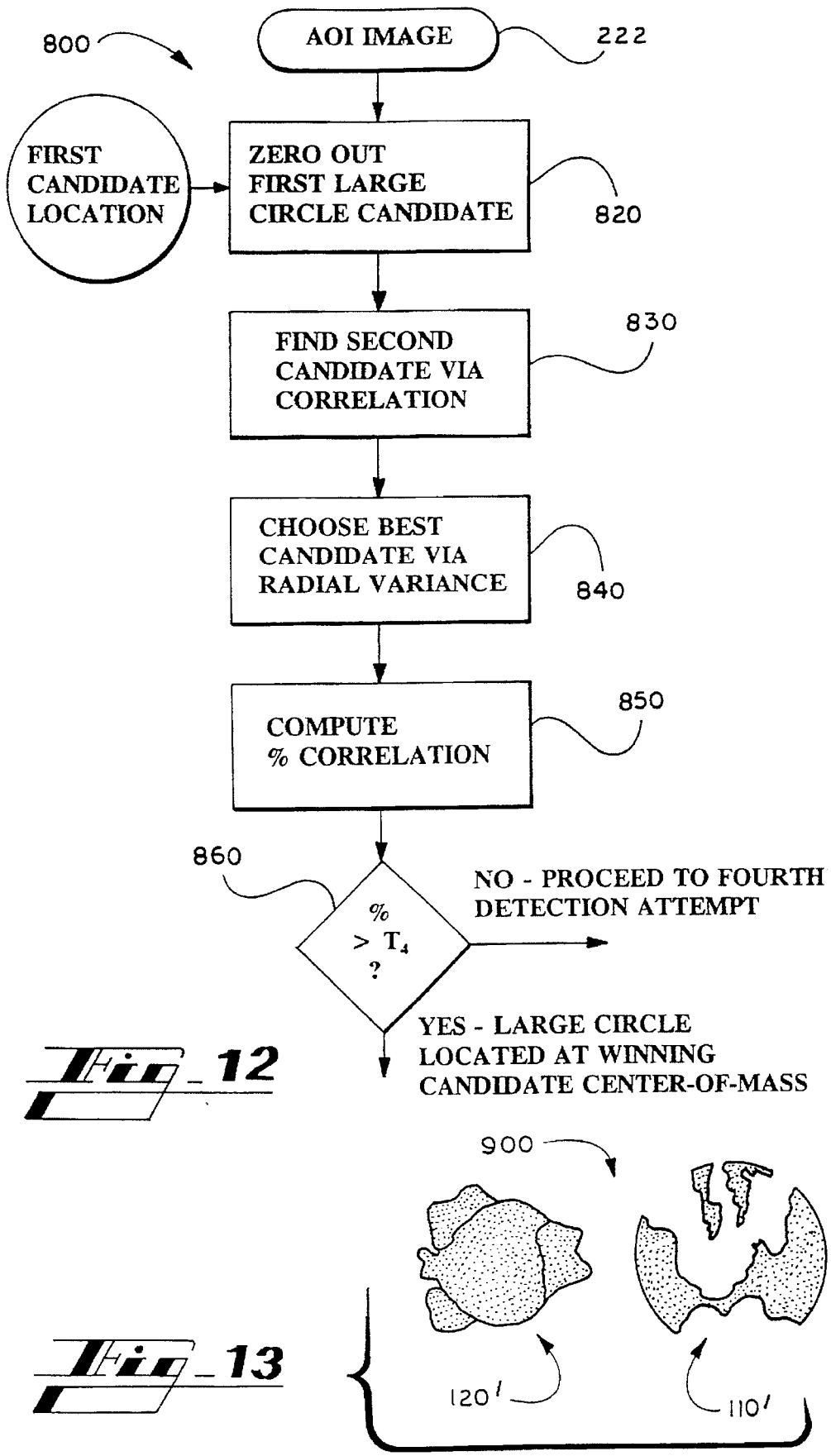
Fig_12
Fig_13

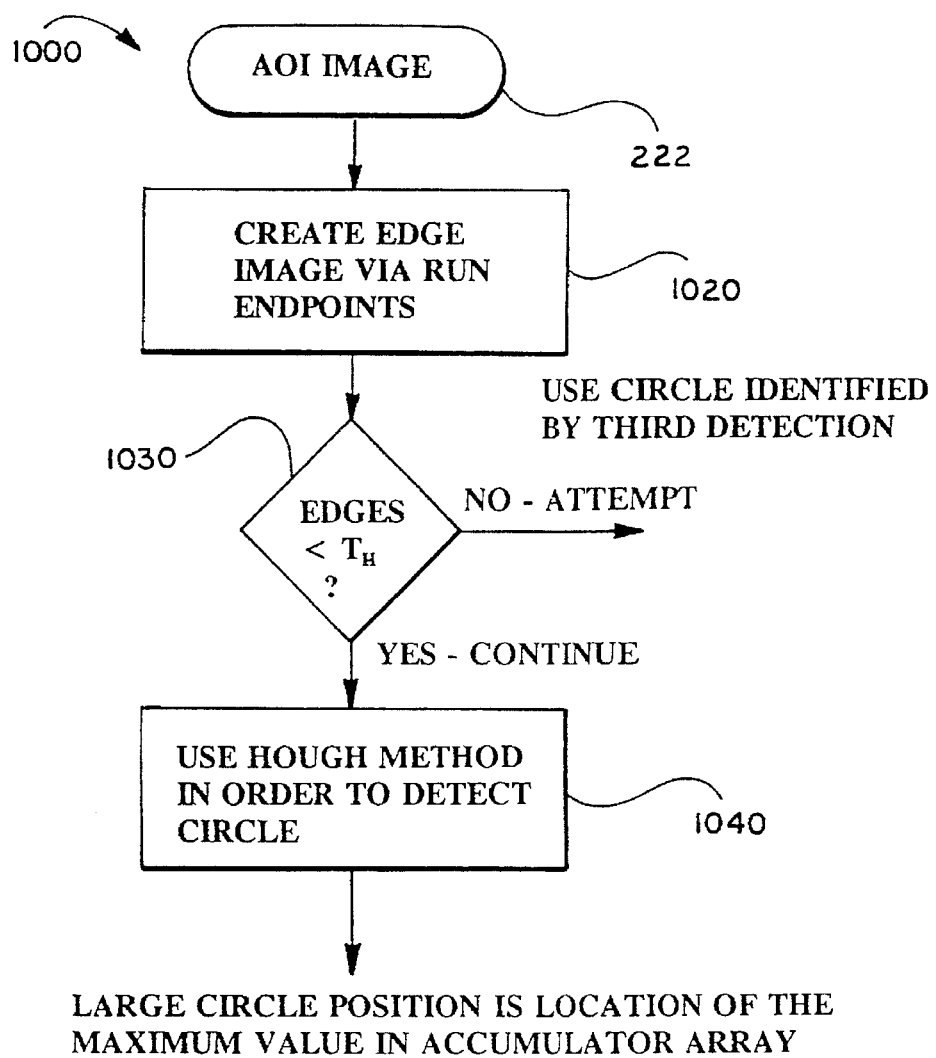
*Fig_14*
*Fig_15*
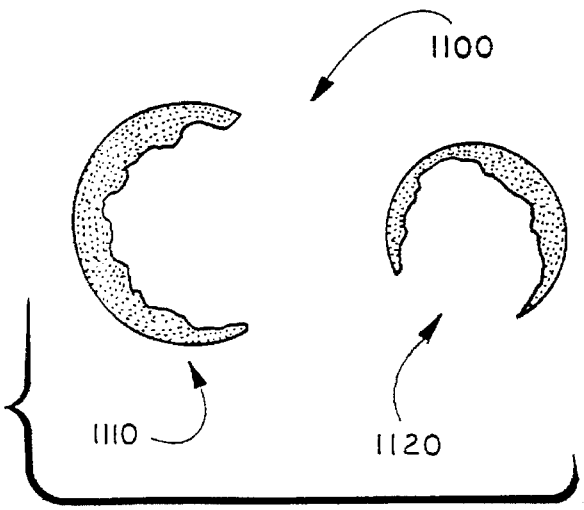

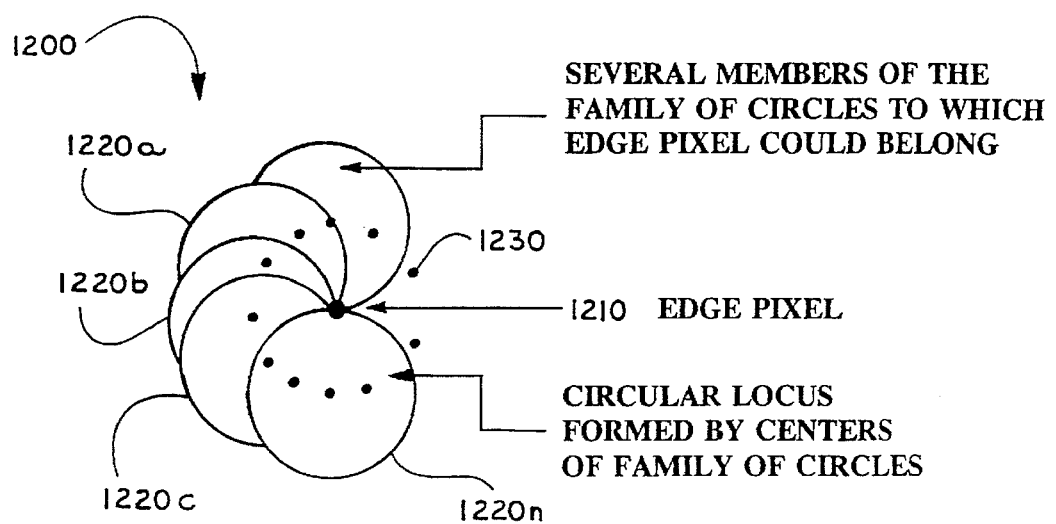
Fig_16
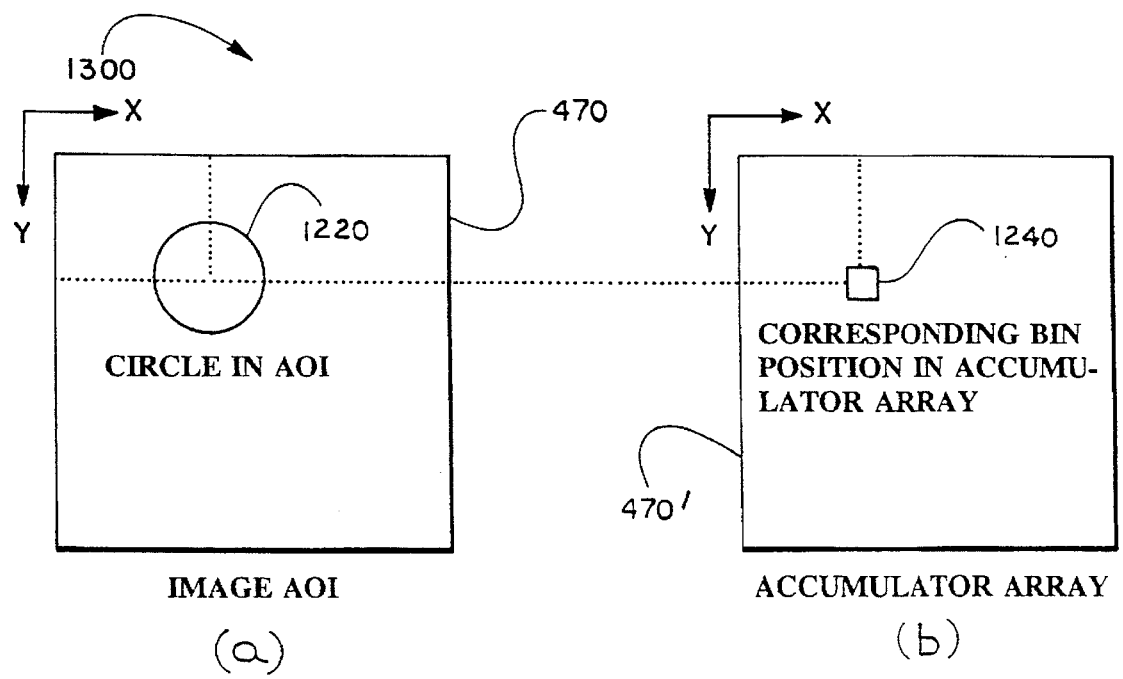
Fig_17

METHOD FOR LOCATING THE POSITION AND ORIENTATION OF A FIDUCIARY MARK

REFERENCE TO RELATED APPLICATION

This application is a continuation of the commonly owned pending U.S. patent application Ser. No. 08/419,176, now abandoned "Method for Locating the Position and Orientation of a Fiduciary Mark" filed Apr. 10, 1995.

TECHNICAL FIELD

The present invention relates to the processing of optical images, and more particularly relates to over-the-belt optical character recognition readers. Specifically, the present invention relates to a method for locating the position and orientation of text, such as the destination address, affixed to a parcel as it moves along a conveyor.

BACKGROUND ART

For years, machines have been used to scan parcels as they move along a conveyor. Over-the-belt optical character recognition (OCR) readers have been developed that can capture an image of the surface of a parcel as it moves along a conveyor, and then create and process a representation of the image. The fundamental physical components of an OCR reader are a sensor, an analog-to-digital (A/D) converter, and a computer comprising a memory. The individual physical components of an OCR reader are all well known in the art, and many alternative embodiments of each of the individual physical components are commercially available, with differing cost and performance characteristics. Much effort goes into finding the most efficient combinations of components for particular applications, and in the development of computer software programs that process the images created by these familiar physical components.

Charge-coupled device (CCD) sensor arrays are often used in OCR readers. A CCD camera consists of an array of electronic "pixels," each of which stores an accumulated charge according to the amount of light that strikes the pixel. A CCD camera is used to quickly capture an image of the surface of a parcel as it moves along a conveyor. The image is then converted into digital format which is then stored as a bit map in a computer memory. The CCD array is then reset by dissipating the charge within the pixels, and the array is ready to capture the image of another parcel. In this manner, a single CCD camera is used to scan a great many parcels.

CCD cameras vary in resolution and sensitivity. Generally, color cameras are more expensive than monochrome cameras; higher resolution cameras are more expensive than lower resolution cameras. There is therefore a financial motivation to use low resolution, monochrome CCD cameras whenever such are suitable for a particular purpose.

Similarly, computers vary in computation speed and other parameters. Generally, faster computers are more expensive than slower computers; special purpose computers are more expensive than general purpose computers. There is therefore a financial motivation to use low speed, general purpose computers whenever such are suitable for a particular purpose.

Parcel delivery companies, such as United Parcel Service (UPS), could make extensive use of OCR reader systems. These parcel delivery companies ship millions of parcels every day. The OCR readers used by parcel delivery companies such as UPS generate an enormous amount of computer data. As a result, there is a need for computer systems that can quickly and accurately process the images created by CCD cameras. For example, computer systems have been developed that can read the destination address written on certain parcels, and cause the parcels to be correctly routed to their destinations. Reading text is a sophisticated task, and the systems capable of doing so are commensurately sophisticated, comprising expensive equipment such as high resolution CCD cameras and high speed computers.

Before the text affixed to a parcel can be read, it is necessary for the location and orientation of the text to be determined. A fiduciary mark may be used to by an OCR reader system to ascertain the location and orientation of an object or text affixed to an object. A fiduciary mark is an indicia of known optical signature which is placed on an object to be scanned with an OCR reader. An OCR reader system scans a parcel bearing a fiduciary mark and locates the fiduciary mark. In this manner, a fiduciary mark which is placed in a known relation to the destination address block of a parcel can be used by the OCR system to locate the position of the destination address block. Similarly, an orientation specific fiduciary mark whose orientation is placed in a known relation to the orientation of the text within a destination address block can be used by an OCR system to ascertain the orientation of the text.

To the extent that certain tasks required of an OCR reader system that are less sophisticated than reading text can be performed by other less expensive equipment than that used to read text, the more expensive equipment required to read text can be more efficiently dedicated to the more sophisticated task of reading text. Ascertaining the position and location of a fiduciary mark is an example of a function required of an OCR reader system that can be performed with less sophisticated equipment than that which is required to read text. There is therefore a financial motivation to ascertain the location and orientation of fiduciary marks using systems comprising low cost CCD cameras and general purpose computers.

There are a number of well known image processing techniques that are used to process images stored in a computer memory. For two dimensional images, a two-dimensional bit map matrix stored in computer memory represents the pixels of a CCD array. An orthogonal coordinate system corresponds to the matrix. Thus, the bit map uniquely identifies the position of each pixel of the CCD array. Three-dimensional or higher-dimensional bit maps similarly represent three-dimensional or higher-dimensional images in a computer memory. Polar or other coordinate systems similarly define positions within the matrix.

Standard image processing techniques will be familiar to those skilled in the art including: using projection histograms, convolution filtering, correlation, computation of the center of mass of image areas, and edge image analysis including the Hough Method.

A fiduciary mark may comprise any shape or combination of shapes. Certain configurations are inherently more efficient to search for than others. For example, a circular configuration is efficient to search for because of its rotation-invariant nature. Thus, a circle does not require consideration in a multiplicity of angular orientations.

A number of U.S. patents teach circular fiduciary marks. For example, Miette, U.S. Pat. No. 5,103,489, describes a label, method and device for locating addresses on articles to be sorted. The system uses a preprinted label including an address locating mark comprising a rotation invariant component and an irregular component (i.e., an orientation-specific mark inside a circle). The processing technique first locates the circular image and then ascertains the rotational aspect of the irregular component. The software program ascertains the rotational aspect of the irregular image by comparing the image of the irregular component with a limited number of predetermined reference signals defining various discrete orientations (i.e., correlation).

The system described in Miette suffers from a number of disadvantages. For example, the use of a rotation-specific component makes the fiduciary mark less efficient to search for than a mark comprising only circular images might be. Moreover, it relies on an opaque fiduciary mark that cannot occupy the same area as the text comprising the address without partly obscuring the text. Therefore, the fiduciary mark must be o located in a known relation to the address block on every parcel to be scanned outside the area to be marked with text. As a result, such systems generally require preprinted labels or parcels comprising the fiduciary mark and specifying a markable area for placing text. Thus, there remains after Miette a need for a more efficient, more versatile fiduciary mark system.

A number of U.S. patents teach the use of a combination of circular images of different sizes to define orientation. For example, Keane, et al., U.S. Pat. No. 4,760,247, describes an optical card reader utilizing area image processing. The system reads lottery tickets with markable areas and ascertains the location and orientation of the markable area of a ticket by first locating and identifying three circular images printed on the ticket. Similarly, Acker, U.S. Pat. No. 3,8012,775, describes a method and apparatus for identifying objects. The system described is a bar code reader including a scan controller, video processor, and data processor. An object displaying a bar code includes two circular images, one located on each end of the bar code. The circular image on one end comprises a different pattern of concentric circles than the image on the other end, so as to identify the orientation of the bar code.

The systems described in Keane, et al. and Acker suffer from some of the same disadvantages as the system described in Miette. Namely, they rely on opaque preprinted fiduciary marks. There still remains after Keane, et al. and Acker the need for a more versatile fiduciary marking system. In particular, the parcel delivery industry has a need for a fiduciary mark system that can be applied to a parcel after the address has been affixed to the parcel. In this manner, the system will not rely on preprinted labels or parcels.

Fluorescent markings provide a means for reading indicia with a CCD camera wherein the indicia may occupy the same area as opaque text. When exposed to ultraviolet light, the fluorescent markings are readable by a CCD camera, while the text is relatively invisible. Conversely, when exposed to white light, the opaque text is readable by a CCD camera, while the fluorescent markings are relatively invisible. In this manner, both types of markings, opaque text and fluorescent indicia, can occupy the same area on a substrate.

Several references describe the use of fluorescent markings to highlight text bearing areas of objects to be read by CCD cameras. Buchar et al., Canadian Patent Application No. 2,047,821, describes an electronic filing system recognizing highlighted text within a document to be scanned to establish classification and retrieval information. A human operator examines a document to be registered into the system, and manually highlights with a fluorescent marking pen a portion of text which will be used by the system to identify the document. A raster scanning unit including a CCD array identifies the highlighted area when the document is scanned and records the text within the highlighted area for use by the retrieval system.

Ng, et al., U.S. Pat. No. 5,138,465, describes a method and apparatus for highlighting nested information areas for selective editing. Two fluorescent markings of different reflectivity are used in combination to define a combination of areas of interest (e.g., the area inside both markings, the area inside the area defined by one marking and outside the area defined by the other marking, etc.). The systems may use documents with pre-printed markings, or the markings may be applied with fluorescent marking pens after the text to be scanned has been affixed.

The systems described by Buchar et al. and Ng, et al. suffer from an important limitation. Namely, documents using these systems must be oriented properly when fed into a document scanner for the text to be read properly. While these systems teach the use of fluorescent markings to identify the location of text, they do not teach the use of fluorescent markings to specify the orientation of the text. Therefore, these systems would not be useful for reading text on the surface of a parcel as it moves along on a conveyor.

Thus, there is a great need for a flexible, easy to use, highly accuracy, inexpensive fiduciary mark system that can be used in conjunction with over-the-belt or other OCR readers. In particular, there is a great need for a fiduciary mark system that can process a sufficiently large number of images quickly enough to be used as an integral part of the automatic parcel handling systems used in the parcel delivery industry. To be advantageous, such a system should comprise a number of important advantages including: (1) the use of low cost components such as a low resolution monochrome CCD camera and a general purpose computer; (2) the ability to ascertain the location and orientation of the address block without relying on a standardized or pre-printed label or container; (3) the ability to read fiduciary marks affixed to the parcel either before or after the address has been written on or attached to the parcel, without obscuring the address; (4) the ability to identify poorly formed or damaged fiduciary marks; (5) the ability to reliably reject false marks; and, (6) the ability to accomplish the identification in a highly accurate yet computationally efficient manner.

SUMMARY OF THE INVENTION

The present invention meets the above objectives by providing a system and method for ascertaining the location and orientation of a substrate through the use of a fiduciary mark affixed to the substrate. The fiduciary mark defines the position and orientation of the substrate.

Additionally, the present invention meets the above objectives by providing a system and method for ascertaining the location and orientation of readable o indicia affixed to a substrate, such as text in the address block on a parcel, through the use of a fiduciary mark affixed to the same substrate in the same location as the readable indicia. The fiduciary mark defines the position and orientation of readable indicia affixed to the substrate. The fiduciary mark is non-obstructive of the readable indicia, and may be affixed to the substrate at any time prior to scanning, either before or after the readable indicia has been affixed to the substrate. The fiduciary mark and the readable indicia are separately readable when both are affixed in the same location on the same substrate.

The fiduciary mark comprises two non-concentric circles of different optical signature such that each circle is separately identifiable. Thus, a vector from the center of one circle to the center of the other circle defines both the position and the orientation of the fiduciary mark. The combination of circular components comprising the fiduciary mark allows several image processing techniques to each be employed in a computationally efficient manner, and combined in a sequence that produces a highly accurate identification. Poorly formed or degraded marks are reliably identified, and false marks are reliably rejected.

The preferred embodiment is specifically developed for use as an integral part of an over-the-belt OCR reader system for scanning parcels. The fiduciary mark system uses low cost components including a low resolution, monochrome line-scan type CCD camera, a standard video controller, a standard one-bit A/D converter, and a general purpose computer including a first-in-first-out (FIFO) buffer. The fiduciary mark system scans a parcel as it moves along an adjacent conveyor, and determines the position and location of the address affixed to the parcel by ascertaining the position and orientation of a fluorescent-ink fiduciary mark located in the destination address block (DAB) of the parcel. The fiduciary mark is located roughly in the center of the DAB, and comprises two non-overlapping circles of different diameter such that a vector from the center of the larger circle to the center of the smaller circle is oriented in the same direction as the underlying text.

The fiduciary mark may be applied to the parcel any time prior to scanning, either before or after text is placed in the DAB. For example, the fiduciary mark may be manually applied to the parcel with an ink stamp when the parcel is entered into a parcel handling system. Alternatively, the fiduciary mark may be affixed to preprinted labels or containers. Similarly, a fiduciary mark may be incorporated into a transparent envelope which is affixed to a parcel, and into which an address label is placed.

A computer system is used to process an image of a fiduciary mark to determine the position and orientation of the mark. The computer system identifies fiduciary marks with a high degree of accuracy, even when the mark is poorly formed or partially degraded. Additionally, the system reliably rejects false marks. The computer system is computationally efficient so that it may be performed quickly on a relatively inexpensive general-purpose computer. To obtain these characteristics, the computer system employs a series of image processing techniques of increasing computational expense separated by measurements that assess the quality of the mark. Well-formed marks are identified and eliminated from further processing early in the process, while poorly formed or partially degraded marks are subjected to more rigorous and computationally expensive techniques. The ability to apply the selected succession of image processing techniques to produce a highly accurate yet computationally efficient identification system results, in part, from the combination of circular components comprising the fiduciary mark.

The fiduciary mark preferably consists of two non-overlapping circles of different diameter oriented so that a vector from the center of the larger circle to the center of the smaller circle is oriented in the direction of the underlying text. The computer system preferably processes the image through a sequence of discrete steps including: (1) Area of Interest (AOI) detection; (2) large circle detection; (3) small circle detection; and, (4) detection confidence thresholding. Circles were selected as the mark components because they can be identified in an efficient manner due to the rotation-invariant nature of a circular image. Circles of sufficiently different size were selected to allow the software program to identify the large circle without obtaining false identifications from the small circle image. Two circles were employed to provide an orientation vector from their combination Each circle is identified individually, and the orientation of the DAB is determined from the resulting center-to-center orientation vector.

AOI detection is performed to determine the approximate location of the DAB on the parcel, and to crop the image of the surface of the parcel down to a smaller AOI that will be searched for the fiduciary mark. Limiting the area that will be searched for the fiduciary mark improves the computational efficiency of the search. AOI detection is accomplished through a projection histogram and filter processing technique. Vertical and horizontal projection histograms of the image of the lo surface of a parcel are computed and filtered via convolution with a triangular kernel whose width is the maximum dimension of the fiduciary mark (i.e., the sum of the diameters of the two circles plus the distance between them). An approximately square AOI is defined about the intersection of the filters projection histogram maxima.

Large circle detection is accomplished through a series of image processing techniques of increasing computational expense. If the large circle is identified within threshold limits after any of the steps in the sequence, the system moves on to small circle detection. Thus, the great majority of large circles which are well-formed are identified by the computationally inexpensive early detection attempts, and the more computationally expensive later steps are required for only a small percentage of large circles that are poorly formed or partially degraded.

The first detection attempt computes projection histograms of the pixel values within the AOI, and filters the projection histograms for this purpose via convolution with a triangular kernel whose width is equal to the diameter of a nominal large circle. A circular area slightly larger than a nominal large circle is defined about the intersection of the filtered projection histogram maxima. First moments of inertia are then used to determine the center of mass in the area. The mass within the a circular region slightly larger than a nominal large circle about the center of mass is then computed and compared with a set of threshold values. The large circle is deemed to have been successfully located if the mass is within the bounds defined by the threshold values.

If the first attempt fails, a second detection attempt is undertaken which uses a two-dimensional correlation within the AOI, between the image in the AOI and a template corresponding to a nominal large circle image. The circular image is the most efficient shape to locate via correlation because it is rotation-invariant. To improve the efficiency of the correlation, a two-stage process is employed. The first stage is a coarse series of correlations conducted about a small subset of the pixels in the image. The second stage is a fine series of correlations conducted about each pixel in a pre-defined region about the pixel with the highest first stage series of correlations. A correlation measure, such as percent correlation, is then computed and compared to a threshold value. The large circle is deemed to have been successfully located if the mass is greater than the threshold values.

If the second attempt fails, the third detection attempt identifies the two images in the AOI with the largest mass within a circular area approximating the size of a nominal large circle, and computes the radial variance of each candidate. The candidate with the larger radial variance is deemed to be the preferred candidate. A variance measure, such as percent correlation, is then computed for the preferred candidate and compared to a threshold value. The large circle is deemed to have been successfully located if the variance measure is greater than the threshold value. Once again, circular images are the most efficient shapes to locate using radial variance as a comparison technique. This technique may allow the software program to distinguish between a severely degraded large circle image, and the small circle image.

Finally, if the third attempt fails, a fourth detection attempt is employed to analyze the edges of image within the AOI. First, run length encoding is used to identify distinct sets of connected pixels within rows or columns comprising the image. The end points of the runs define the pixels comprising the edges of the image. The well known Hough Method is then used to compare the edges of the images in the AOI to the edge configuration of a nominal large circle template. An edge correspondence measure is then computed for the candidate large circle and compared to a threshold value. The large circle is deemed to have been successfully located if the edge correspondence measure is greater than the threshold value. Once again, a circular image is the most efficient shape to locate because the edge image of a circle is rotation-invariant.

Once the large circle has been located, the computer system attempts to locate the small circle, using a process nearly identical to the large circle identification process described above, with four significant differences. First, all of the pixel values identified as the large circle are set to zero. Second, the AOI is limited to an annular region about the large circle location. Third, the filter kernel used is triangular with maximum dimension equal to the diameter of a nominal small circle. Fourth, there are only three detection attempts because there is no equivalent to the third detection attempt employed for the large circle. In addition, the search parameters such as correlation and edge templates and the various threshold values correspond to a nominal small circle.

Small circle detection is followed by detection confidence thresholding, which employs three distinct confidence measures to determine whether the image identified is in fact a fiduciary mark. One confidence measure is based on the distance between the centers of the two circles identified by the system, and the distance between the centers of the two circles in a nominal fiduciary mark. The other two confidence measures are equal to normalized correlation values obtained from the large and small circle detection routines. A final confidence measure may be derived from the three confidence measures computed. For example, a conservative final confidence measure is equal to the minimum of the three individual confidence measures.

According to another aspect of the invention, a novel article is provided comprising readable indicia on a substrate, and a fiduciary mark non-obstructive of the readable indicia, positioned in the same location as the readable indicia to indicate the orientation of the indicia. The readable indicia and fiduciary mark are separately identifiable by scanning equipment.

According to a further aspect of the invention, a system is provided for scanning a moving object to determine orientation information pertaining to the object. The system comprises a reader, a conveying system for moving the object adjacent to the reader, a fiduciary mark on the object comprising a pair of circles of differing size aligned to define the orientation information, and a computer configured to process an image of the object to identify the fiduciary mark.

Thus, it is an object of the present invention to provide a fiduciary mark system usable with an OCR reader wherein the location and orientation of the address block may be ascertained without relying on a standardized or preprinted label or container.

It is a another object of the present invention to provide a fiduciary mark system for scanning a moving object to determination orientation information pertaining to the object.

It is a another object of the present invention to provide a fiduciary mark system wherein the fiduciary mark may be affixed to the parcel in the same area as the address, either before or after the address has been written on or attached to the parcel, without obscuring the address.

It is a another object of the present invention to provide a fiduciary mark system wherein poorly formed or damaged fiduciary marks may be reliably identified.

It is a another object of the present invention to provide a fiduciary mark system reader wherein false marks may be reliably rejected.

It is a another object of the present invention to provide a highly accurate yet computationally efficient fiduciary mark system.

It is a another object of the present invention to provide a low cost fiduciary mark system.

It is a another object of the present invention to provide a fiduciary mark system comprising a general purpose microcomputer.

It is a another object of the present invention to provide a novel article comprising readable indicia on a substrate, and a fiduciary mark non-obstructive of the readable indicia, positioned in the same location as the readable indicia to indicate the orientation of the indicia. The readable indicia and fiduciary mark are separately identifiable by scanning equipment.

It is another object of the present invention to provide an improved label bearing a direction-indicating mark.

It is another object of the present invention to provide an improved label bearing a direction-indicating mark that can be placed on the label after informative text without obscuring the text.

It is another object of the present invention to provide an improved OCR reader system capable of determining orientation information pertaining to an object scanned by the reader system.

BRIEF DESCRIPTION OF THE DRAWINGS

FIG. 1 is a block diagram of a fiduciary mark system.

FIG. 2 shows a fiduciary mark located within the destination address block of a parcel.

FIG. 3 shows a nominal fiduciary mark and its dimensions.

FIG. 4 shows the definition of the position and orientation of a nominal fiduciary mark.

FIG. 5 shows poorly formed fiduciary marks.

FIG. 6 is the top level flow chart of the software program used to process fiduciary marks.

FIG. 7 is a flow chart of the area of interest (AOI) detection routine, which is a part of the software program used to process fiduciary marks.

FIG. 8 including FIGS. 8A and 8B illustrates certain steps comprising the AOI detection routine.

FIG. 9 is a flow chart of the first detection attempt subroutine, which is a part of the large circle detection routine, which, in turn, is a part of the software program used to process fiduciary marks.

FIG. 10 illustrates certain steps comprising the first detection attempt subroutine.

FIG. 11 is a flow chart of the second detection attempt subroutine, which is a part of the large circle detection routine, which, in turn, is a part of the software program used to process fiduciary marks.

FIG. 12 is a flow chart of the third detection attempt subroutine, which is a part of the large circle detection routine, which, in turn, is a part of the software program used to process fiduciary marks.

FIG. 13 illustrates the type of poorly formed fiduciary mark that the third detection attempt subroutine may successfully identify.

FIG. 14 is a flow chart of the fourth detection attempt subroutine, which is a part of the large circle detection routine, which, in turn, is a part of the software program used to process fiduciary marks.

FIG. 15 illustrates the type of poorly formed fiduciary mark that the fourth detection attempt subroutine may successfully identify.

FIG. 16 illustrates certain steps comprising the fourth detection attempt subroutine.

FIG. 17 including FIGS. 17A and 17B illustrates certain steps comprising the fourth detection attempt subroutine.

FIG. 18 illustrates certain steps comprising the small circle detection routine.

DETAILED DESCRIPTION

Referring now in more detail to the drawings, in which like numerals refer to like elements throughout the several drawings, FIG. 1 shows a fiduciary mark system 10 usable as part of an over-the-belt optical character recognition reader system comprising conveyer 20 on which parcel 30 is being carried. Parcel 30 bears address destination block 40, in which text indicating the destination address is written (not shown in FIG. 1, but shown in FIG. 2). Affixed within destination address block 40 is fiduciary mark 50. UV light source 52 in conjunction with reflector 54 illuminates fiduciary mark 50 as parcel 30 is conveyed through the viewing area of CCD camera 60, which captures an image of the surface of parcel 30 including fiduciary mark 50.

Controller/converter 70 includes a standard video controller that controls the scan rate of CCD camera 60. Belt encoder 90 provides a signal indicating the speed of conveyor 20 to controller/converter 70. Belt encoder 90 also provides a signal indicating the speed of conveyor 20 to second system comprising a second CCD camera 95, which is thereby synchronized with CCD camera 60. In this manner, the system comprising camera 95 may be a used to read text within a predetermined area comprising fiduciary mark 50, the mark having been previously located by fiduciary mark system 10.

Controller/converter 70 also includes a standard one-bit A/D converter. CCD camera 60 transmits an analog image to controller/converter 70, which converts the analog signal into a digital representation of the image, which is then transmitted to computer 80, where it is stored as a bit map.

Computer 80 contains software program 100. Software program 100 processes the image of the surface of parcel 30 by identifying and ascertaining the location and orientation of fiduciary mark 50, and thus determining the orientation and position of the text within the destination address block on parcel 30. Computer 80 comprises a standard microprocessor such as Heurikon HKV4d 68040 CPU board, and a FIFO buffer controlled by a signal produced by controller/converter 70. The FIFO buffer and CPU are in communication through a VME bus housed within computer 80. Those skilled in the art will appreciate that a converter/controller comprising an A/D converter and a video processor controlling both a line scan-CCD camera and a FIFO buffer, can be used to produce a two-dimensional computer image of an object moving past the camera along a conveyor belt when provided with a signal from a belt encoder indicating the speed of the conveyor belt. See, for example, Shah et at., U.S. Pat. No. 5,291,564, which is hereby incorporated by reference.

In the preferred embodiment, fiduciary mark 50 comprises two fluorescent ink non-overlapping circles of different diameter. As used herein, a circle means either an annulus or the area bounded by an annulus. The ink is of a type that fluoresces in the green/yellow part of the spectrum when exposed to ultraviolet light. The surface of parcel 30 is illuminated by ultraviolet light as it moves through the readable range of CCD camera 60. CCD camera 60 is a low resolution, monochrome, 256 pixel line-scan type camera such as a Thompson TH7806A, TH7931D. Camera 60 is mounted to have an optical path of 52 inches to conveyor 20, with a 16 inch field of view at the conveyor. CCD camera 60 is fitted with a lens assembly including a filter sensitive to green/yellow light.

Those skilled in the art will appreciate that many different combinations of hardware will be suitable for practicing the present invention. Many commercially available substitutes, each having somewhat different cost and performance characteristics, exist for each of the physical components listed above. For example, computer 80 could be hard-wired logic, reconfigurable hardware, an application specific integrated circuit (ASIC), or some other equivalent means for implementing a set of instructions.

Conveyer 20 carries approximately 3,600 parcels per hour, and moves at a rate of 80 feet per minute. CCD camera 60 is positioned approximately 20 inches above the center of conveyer 20 and is pointed towards a first mirror (not shown), which is pointed towards a second mirror (not shown), which is pointed at conveyor 20, such that the optical path from CCD camera 60 to conveyor 20 is 52 inches. These parameters may be varied somewhat without unduly affecting the performance of the present invention. Those skilled in the art will appreciate that mirror systems can be used to increase the optical path length of a camera system while accommodating a smaller physical distance between the camera and the object to be imaged. See, for example, Smith et al., U.S. Pat. No. 5,308,960, which is hereby incorporated by reference.

Fiduciary mark 50 comprises fluorescent ink such as sold commercially as National Ink No. 35-48-J (Fluorescent Yellow). Fiduciary mark 50 can be applied to the parcel any time prior to scanning. In particular, it is anticipated that a human operator may apply fiduciary mark 50 with a rubber ink stamp at the time the parcel is received from the customer and placed into the parcel handling system.

FIG. 2 shows fiduciary mark 50 as located within destination address block 40 on the surface of parcel 30 more clearly. Parcel 30 includes within destination address block 40 text 60 indicating the destination address of parcel 30. Fiduciary mark 50 is located approximately in the center of destination address block 40 and comprises two non-overlapping circular images of different size oriented such that a vector from the larger component toward the smaller component is oriented approximately in the same direction as underlying text 60. It will be clear to one skilled in the art that alternative embodiments might include locating the fiduciary mark elsewhere on the parcel in a known relation to text bearing area 40, or in a different known relationship to the underlying text. Similarly, fiduciary mark 50 might be carried on a label, preprinted upon the parcel, or might be carried upon a transparent envelope into which an address label is placed.

FIG. 3 shows the preferred configuration of a nominal fiduciary mark 50 in more detail. Nominal fiduciary mark 50 comprises large component 110 and small component 120. Components 110 and 120 are each circular, and they are separated by a distance G. The diameter $D_L$ of large component 110 is approximately ¾ of an inch. The diameter $D_s$ of smaller component 120 is approximately 7/16 of an inch. G is approximately ¼ of an inch. Acceptable performance is observed for the o preferred embodiment when the above fiduciary mark parameters are used. Alternative embodiments might vary the size of the components of fiduciary mark 50 somewhat without unduly affecting the performance of the present invention.

A limit is imposed upon the size of fiduciary mark 50 by the resolution of CCD camera 60. Thus, fiduciary mark 50 may be made smaller if CCD camera 60 has a higher resolution, and the resolution of CCD 60 may be reduced if fiduciary mark 50 is made larger. Due to the physical characteristics of a nominal fiduciary mark shown in FIG. 3 and the physical circumstances under which fiduciary mark system I0 is used as shown in FIG. 1 including the length of the optical path between CCD camera 60 and conveyor 20 and the height of most parcels processed by fiduciary mark system 10, the system has sufficient depth of field such that the size of a nominal fiduciary mark may be considered to be a constant for all parcels processed by fiduciary mark system 10.

FIG. 4 shows with particularity how the position and orientation of fiduciary mark 50 are defined. The location of large circle 110 is defined to be a single pixel location 130 located approximately at the center of large circle 110. The location of small circle 120 is defined to be a single pixel location 140 located approximately at the center of small circle 120. Vector 150 is drawn from pixel location 130 to pixel location 140 and thus defines the orientation of fiduciary mark 50. The pixel location 160 located approximately at the midpoint between pixel location 130 and pixel location 140 along vector 150 is defined to be the position of fiduciary mark 50.

An important aspect of the fiduciary mark system 10 is its ability to correctly identify poorly formed or degraded fiduciary marks such as fiduciary marks 50' and 50" shown in FIG. 5. Fiduciary mark 50' is poorly formed because it comprises too little fluorescent ink. Fiduciary mark 50", on the other hand, is poorly formed because it comprises too much fluorescent ink as might result from smearing of the mark. The fiduciary mark system 10 is capable of identifying fiduciary marks under both of the conditions exemplified by fiduciary marks 50' and 50", and is further capable of reliably rejecting false fiduciary marks. These capabilities result from the design of software program 100, as described below.

FIG. 6 shows a top level flow chart of the operations carried out by software program 100. In FIG. 6 and in the following flow charts, oval or circular shaped enclosures indicate inputs, square or rectangular shaped enclosures indicate process steps, diamond shaped enclosures indicate decision steps, hexagonal shaped enclosures indicate outputs, and unenclosed text indicates explanatory information.

The input to software program 100 is image 210. Referring now to FIG. 1, image 210 is the image of the surface of parcel 30 which was captured by CCD camera 60, converted to digital form by controller/converter 70, and stored as a bit map in computer 80. Returning to FIG. 6, software program 100 performs a series of routines on image 210 comprising area-of-interest (AOI) detection routine 220, large circle detection routine 230, small circle detection routine 240, and detection confidence thresholding routine 250. The result of software program 100, shown as output 260, is a determination of the position and orientation of a fiduciary mark included in image 210, or alternatively a determination that no fiduciary mark is included in image 210. If software program 100 determines that a fiduciary mark is included within image 210, it produces as output the position and orientation of the fiduciary mark expressed as position 160 and orientation vector 150, as shown best in FIG. 4.

FIG. 7 shows with particularity the steps comprising AOI detection step 220. The input to AOI detection step 220 is image 210 containing a possible fiduciary mark. AOI detection routine 220 first compares the area represented by image 210 to a threshold value $T_A$, and skips the remaining steps of AOI detection routine 220 if the area represented by image 210 is less than $T_A$. Referring to FIG. 4, acceptable performance is observed for the preferred embodiment when $T_A$ is defined to be slightly larger than the square of the sum $D_L + D_S + G$. This parameter may be varied somewhat without unduly affecting the performance of the system.

The next step 214 of AOI detection routine 220 comprises computing projection histograms corresponding to image 210 along a set of orthogonal axes defined by the edges of image 210. Using projection histograms is a known technique for processing an image stored in a computer memory. See, for example Robert J. Schalkoff, *Digital Image Processing and Computer Vision* (1989), at page 196.

For example, a projection histogram may be a one-dimensional array containing a representation of an image along one of a set of orthogonal axes. Each member of the projection histogram may correspond to one point along the axis, and contain a value equal to the sum of the matrix values in a corresponding orthogonal row or column. In this manner, a projection histogram represents the "mass" of a bit map along an axis. As used in this context, the "mass" of a group of members of a bit map refers to the sum of the values of the members. The mass of a pixel is equal to 1 if fluorescing; 0, if not. The mass of an area of a bit map thus represents the amount of light exposing a group of pixels of CCD camera 60.

FIG. 8(a) depicts image 210 comprising possible fiduciary mark 50''', and projection histograms 410 and 420. Projection histogram 410 is a one-dimensional representation of the image 210 wherein each member of the projection histogram represents the mass of a row of image 210 perpendicular to the projection histogram 410. Projection histogram 420 is a one-dimensional representation of the image 210 wherein each member of the projection histogram represents the mass of a column of image 210 perpendicular to the projection histogram 410.

The next step 216 of AOI detection routine 220 comprises filtering projection histograms 410 and 420 through convolution with a triangular kernel of maximum width equal to the maximum width of a nominal fiduciary mark, $D_L+D_S+G$. Convolution is a well known filtering technique in the signal processing art. Convolution with a triangular kernel helps to identify the center of mass of objects similar in width to the triangular kernel. See, for example, Herbert P. Neff, *Continuous and Discrete Linear Systems* (1984), at pages 66–69.

FIG. 8(b) depicts image 210 comprising fiduciary mark 50''', and filtered projection histograms 430 and 440. Filtering projection histograms 410 and 420 with a triangular kernel of maximum width equal to the maximum width of a nominal fiduciary mark tends to diminish features of the projection histograms that are not consistent with a nominal fiduciary mark.

The next step 218 of AOI detection routine 220 comprises determining projection histogram maximum lines 450 and 460. Projection histogram maximum line 450 is perpendicular to filtered projection histogram 430 and passes through the member of filtered projection histogram 430 with the highest value. Projection histogram maximum 460 is perpendicular to filtered projection histogram 440 and passes through the member of filtered projection histogram 440 with the highest value. An approximate square 470 is then defined about the intersection of lines 450 and 460. Square 470 is defined to be large enough to ensure that it will encompass a nominal fiduciary mark. Referring to FIG. 3, square 470 is defined to be of edge dimension slightly larger than $D_L+D_S+G$.

The result of AOI detection step 220 is AOI image 222, which is the portion of image 210 that is bounded by square 470. The projection histogram and filter technique used to identify AOI image 222 is an efficient one-dimensional means for limiting the amount of image 210 that must be processed using the more computationally expensive two-dimensional techniques that follow.

Once AOI detection routine 220 has been completed, software program 100 proceeds with large circle detection routine 230. Large circle detection routine 230 comprises a series of detection attempt subroutines of increasing computational expense including a first detection attempt subroutine 500 depicted in FIGS. 9 and 10, a second detection attempt subroutine 700 depicted in FIG. 11, a third detection attempt subroutine 800 depicted in FIGS. 12 and 13, and a fourth detection attempt subroutine 1000 depicted FIGS. 14 through 17. As part of each detection attempt subroutine, the area identified by the subroutine as the most likely large circle candidate is compared to a threshold value corresponding to a nominal large circle. If the candidate matches a nominal large circle within a specific threshold, the circle is deemed to have been identified. If the mark is well formed, the candidate image corresponds closely to a nominal large circle, and the large circle is identified by an early detection attempt. Subsequent detection attempt subroutines are skipped if a large circle has been successfully identified by a previous detection attempt subroutine. In this manner, the great majority of well formed large circles are identified by the computationally inexpensive early detection attempt subroutines, and only a relatively few poorly formed or degraded circles are subjected to the relatively computationally expensive later detection attempt subroutines.

FIG. 9 shows the steps of first detection attempt subroutine 500 with more particularity. The input to first detection attempt subroutine 500 is AOI image 222. The first step 520 of first detection attempt subroutine 500 is the computation of projection histograms corresponding to AOI image 222 along a set of orthogonal axes defining the edges of AOI image 222. Alternatively, data comprising the projection histograms corresponding to AOI image 222 may be passed to first detection attempt subroutine 500 by AOI detection routine 220.

The next step 530 comprises convolution of the projection histograms produced by step 520 with a triangular kernel whose maximum width is the diameter of a nominal large circle $D_L$. The next step 540 comprises defining projection histogram maximum lines corresponding to the filtered projection histograms produced by step 530. The next step 550 comprises defining a circular area about the intersection of the filtered projection histogram maxima produced by step 540, as described below, and using the first moments of inertia to compute the center of mass within the circular area configuration. Using first moments of inertia to locate a center of mass is a well known image processing technique corresponding to basic center of mass calculations in Physics. See, for example, Robert Resnick and David Halliday, *Physics, Part I* (1977), at page 164.

The next step 560 comprises defining a circle slightly larger than a nominal large circle about the center of mass produced by step 550, and computing the mass within the second area of predetermined configuration. The next step 570 compares the mass determined by step 560 to two threshold values, $T_1$ and $T_2$. If the mass determined by step 560 is greater than $T_1$ and less than $T_2$, the large circle is deemed to have been identified by first detection attempt subroutine 500, and the remaining subroutines of large circle detection routine 230 are skipped. $T_1$ and $T_2$ are defined to the lower and upper limits required for an acceptable identification of the large circle by routine 500. For example, acceptable performance is observed for the preferred embodiment when $T_1$ is defined to be approximately equal to 95 percent of the mass of a nominal large circle, and $T_2$ is defined to be approximately equal to 105 percent of the mass of a nominal large circle. These parameters may be varied somewhat without unduly affecting the performance of the system.

FIG. 10 illustrates steps 540 through 560. Image 600 shows a portion of AOI image 222. Point 610 is the intersection of the filtered projection histogram maxima produced by step 540. The circular area defined by step 550, circle 620, is defined about point 610 to be a circle larger than a nominal large circle 650, but small enough that it would not intersect the small circle 660 of a nominal fiduciary mark. Comparing FIG. 10 with FIG. 3 shows that the size of circle 620 is limited by $D_L$, the I0 diameter of a nominal large circle, and G, the distance separating the two circles of a nominal fiduciary mark, so that circle 620 will capture substantially all of the mass of a well formed large circle without capturing a substantial portion of the mass of a well formed small circle.

Referring again to FIG. 10, point 630 is the center of the mass within circle 620, which is determined by taking the first moments of inertia of the values within circle 620. Circle 640 is defined about point 630 to be a circle slightly larger than a nominal large circle.

FIG. 11 shows the steps of second detection attempt subroutine 700 with more particularity. Subroutine 700 uses correlation to locate a possible large circle location. Correlation is a well known technique in the image processing art. See, for example, Martin D. Levine, *Vision in Man and Machine* (1985), at page 47.

The input to second detection attempt subroutine 700 is AOI image 222. The first step 720 comprises defining a correlation template corresponding to a nominal large circle. The next step 730 comprises a coarse series of correlations between AOI image 222 and the template. The template is positioned sequentially at different locations within the AOI, and the correspondence between pixel values within the template and those in the AOI image "under" the template is evaluated. The percent correlation, a measure of the correspondence found during a correlation step, is equal to the ratio of exposed pixels in the image "under" the template to the number of pixels comprising the template.

For the coarse series of correlations, the template is sequentially located at a first subset of the pixel locations within AOI image 222. For the preferred embodiment, acceptable performance is observed when the members of the first subset are arranged in orthogonal rows and columns wherein three pixels are skipped between adjacent pixel locations in the same row or column. Thus, approximately one correlation is conducted for every sixteen pixels within the AOI during the coarse series of correlations.

The next step 740 comprises a fine series of correlation between AOI image 222 and the template. For the fine series of correlations, the template is sequentially located at a second subset of the pixel locations within AOI image 222. For the preferred embodiment, acceptable performance is observed when the fine series of correlations is conducted at pixel locations within a 5 pixel by 5 pixel square centered about the pixel location corresponding to the template center location producing the largest correlation from coarse correlation step 730. Thus, twenty four additional correlations are conducted during the fine series of correlations.

The two stage correlation procedure described above is employed to improve computational efficiency. The subsets of pixel locations at which the coarse and fine series of correlation are conducted are parameters that depend on the number of pixels comprising a nominal fiduciary mark, and therefore must be selected in light of the characteristics of fiduciary mark system 10. For the preferred embodiment these parameters may be varied somewhat without unduly affecting the performance of the system.

The next step 750 comprises computing a correlation measure, such as the percent correlation, corresponding to the pixel location producing the largest correlation from fine correlation step 740. The next step 760 compares the correlation measure determined by step 750 to a threshold value $T_3$. If the value determined by step 750 is greater than $T_3$, the large circle is deemed to have been identified by second detection attempt 700, and the remaining steps of large circle detection step 230 are skipped.

The threshold value $T_3$ should be large enough to ensure that the small circle is not identified as the larger circle. For example, acceptable performance is observed for the preferred embodiment when $T_3$ is defined to be equal to the average of the correlation measure associated with a nominal small circle, and the correlation measure associated with a nominal large circle. The parameter $T_3$ may be varied somewhat without unduly affecting the performance of the system. Those skilled in the art will appreciate that parameters other than percent correlation could be used as a correlation measures.

FIG. 12 shows the steps of third detection attempt subroutine 800 with more particularity. Third detection attempt subroutine 800 follows second detection attempt subroutine 700 which identified a first candidate large circle that did not have sufficient mass to be deemed identified by second detection attempt subroutine 700. Therefore, it is likely that a fiduciary mark located within AOI 222 is severely deformed or degraded. The input to third detection attempt subroutine 800 is AOI image 222 and the first candidate's center of mass location.

The first step 820 sets to zero all pixel values within a nominal large circle defined about the first candidate's center of mass location. The second step 830 identifies a second candidate using the same correlation method described above as second detection attempt subroutine 700. The next step 840 restores the pixel values of the first candidate, computes the radial variance of the mass within the first and second candidates, and selects the candidate with the larger radial variance as the most likely large circle candidate. The next step 850 computes a variance measure, such as the percent correlation, associated with of the most likely candidate identified by step 840. The next step 860 compares the variance measure determined by step 850 to a threshold value $T_4$. If the variance measure determined by step 850 is greater than $T_4$, the large circle is deemed to have been identified by third detection attempt subroutine 800, and the remaining steps of large circle detection routine 230 are skipped.

The threshold value $T_4$ should be large enough to ensure that the most likely candidate identified is reasonably likely to be a large circle. For example, acceptable performance is observed for the preferred embodiment when the percent correlation is used as the variance measure, and $T_4$ is equal to 50 percent. This parameter may be varied somewhat without unduly affecting the performance of the system. Those skilled in the art will appreciate that parameters other than percent correlation could be used as a variance measures.

More particularly, step 840 computes the center-of-mass $(x_0, Y_0)$ of each candidate. It then computes the radial variance $r^2$ of each candidate using the following formula:

$$r^2 = \sum_{x,y} m[(x-x_0)^2 + (y-y_0)^2],$$

where x and y are pixel coordinates for the pixels within one nominal large circle radius of the center-of-mass, and m is the mass of a pixel, i.e., 1 or 0. The higher the radial variance, the more a candidate's mass is distributed in terms of area. Large circle third detection attempt 800 is performed to distinguish between the large and small circles associated with a fiduciary mark. Therefore, subroutine 800 chooses the candidate with the higher radial variance as the large circle preferred candidate. The already-computed center of mass is used as then estimated large circle center position, and the percent correlation with a nominal large circle template with its center positioned at the preferred canidate's center of mass is then computed and used as the variance measure associated with the preferred candidate.

FIG. 13 illustrates the type of situation for which third detection attempt subroutine 800 may be successful. Poorly formed fiduciary mark 900 is characterized by a degraded large circle 110', and a small circle 120' which has been augmented by stray markings such as those that could be caused by smearing of the small circle. Because small circle 120' contains more mass than large circle 100', the first and second detection subroutines attempt to identify small circle 120' as the large circle. The third detection attempt subroutine 800 identifies large circle 110' as the most likely large circle component because it has a radial variance more closely approximating a nominal larger component than small circle 120' does.

As it did following the first and second detection attempts, software program 100 determines the quality of the detection by considering a circular area slightly larger than a nominal large circle centered at the center of mass of the preferred large circle candidate. The mass of fluorescing pixels within the circle is computed. If the mass is less than the threshold value $T_4$, then the mark is so seriously eroded that correlation may have failed to locate the large circle with sufficient accuracy. In this case, the software program must perform the fourth detection attempt. Otherwise, software program 100 proceeds to small circle detection.

FIG. 14 shows the steps of fourth detection attempt subroutine 1000 with more particularity. The input to fourth detection attempt subroutine 1000 is AOI image 222. The first step 1020 identifies the pixel values within AOI 222 comprising edge points of the image within AOI 222. First step 1020 identifies edge points by run length encoding the AOI image 222 and identifying as edge points those points where runs begin or end. The next step 1030 compares the number of edge points to a threshold value $T_H$ and terminates fourth detection attempt subroutine 1000 if the number of edge points is above $T_H$. In that event, the preferred candidate identified during the third detection attempt is used as the large circle candidate. Acceptable performance is observed for the preferred embodiment when $T_H$ is less than or equal to 125 percent of the number of edge points comprising a nominal fiduciary mark. This parameter may be varied somewhat without unduly affecting the performance of the present invention.

If fourth detection attempt subroutine 1000 is not aborted by step 1030, step 1040 identifies a large circle candidate by a procedure comprising the Hough Method, which is well known in the image processing art. See, for example, Duda and Hart, "Use of the Hough Transformation to Detect Lines and Curves in Pictures," *Communication of the ACM*, Vol. 15, No. 1, January 1972, pp. 11–15.

FIG. 15 shows the type of image for which the fourth detection attempt might be successful. There is not enough mass in either component 1101 or 1120 to be identified as the large circle by the first three detection attempts. However, the edge of the image is sufficiently well formed to be identified by edge image identification.

FIGS. 16 and 17 illustrate how the procedure comprising the Hough Method is applied in step 1040. An accumulator array is defined wherein each member, or bin, of the array corresponds to a pixel location within AOI image 222. Referring to FIG. 16, an edge pixel 1210 is a point common to a family of possible large circle locations 1220a through 1220n. The centers of the members of the family form a locus comprising a circle 1230 about edge pixel 1210. Each member of the edge of circle 1230 is therefore a possible location of the center of a large circle comprising edge pixel 1210.

Referring now to FIG. 17, a pixel location in AOI 222 corresponds to a possible large circle location as shown in FIG. 17(a), and also corresponds to a bin 1240 in the array as shown in FIG. 17(b). Each bin 1240x corresponds to a pixel location in AOI 222. Each bin 1240x is incremented each time it comprises a possible large circle location corresponding to an edge pixel 1210x within AOI 222, i.e., for each edge pixel 1210x, the bins corresponding to family of pixels 1230x are incremented. Once the bins of the array have been incremented for each edge pixel in AOI 222, the bin with the largest value is deemed to be the bin corresponding to the large circle location.

Referring now to FIGS. 14 and 6, Step 1040 described above is the last possible step taken in an attempt to detect the large circle. Unless software program 100 had deemed the large circle identified in a prior step and had therefore already moved on to small circle detection routine 240, small circle detection routine 40 follows step 1040.

The first detection attempt used by small circle detection routine 240 is nearly identical to the large circle first detection attempt subroutine 500 described above, with three significant differences. First, all of the pixel values identified as the large circle are set to zero. Second, the AOI is limited to an annular region about the large circle location as shown in FIG. 18. Third, the filter kernel used is triangular with maximum dimension equal to the diameter of a nominal small circle, $D_s$.

If the mass of the detected circle is greater than a threshold value $T_{s1}$ and less than a threshold value $T_{s2}$, the software program proceeds to detection confidence thresholding routine 250. Acceptable performance is observed for the preferred embodiment when $T_{s1}$ is equal to 95 percent of the mass of a nominal small circle, and $T_{s2}$ is equal to 105 percent of the mass of a nominal small circle. These parameters may be varied somewhat without unduly affecting the performance of the present invention. If the mass deviates outside of the threshold values, a second detection attempt is required.

The second detection attempt used to locate the small circle is essentially the same as that described for locating the large circle. There are two exceptions. First, the template used for correlation now corresponds to a nominal small circle. Second, because the position of the large circle is known, correlation is only performed in the annular region 242 about the large circle corresponding to possible positions of the small circle as shown in FIG. 18. Next, a two-pass correlation (coarse and fine) is performed, and the resulting correlation measure is compared to a threshold value $T_{S3}$ to determine whether the small circle is deemed located by the second detection attempt. Acceptable performance is observed for the preferred embodiment when $T_{S3}$ is equal to 50 percent. This parameter may be varied somewhat without unduly affecting the performance of the present invention. If the mass deviates outside of the threshold values, a third detection attempt is required.

Because the large circle has already been located, there is no reason to check for a possible substitution error, thus there is no equivalent to third detection attempt subroutine 800 when detecting the small circle. However, if the correlation measure of the second detection attempt is below the threshold value $T_{S3}$, then a third detection attempt described below is conducted. If the correlation measure is above the threshold, the software program 100 proceeds directly to detection confidence thresholding routine 250.

The third detection attempt for the small circle is equivalent to fourth detection attempt subroutine 1000, i.e., the Hough Method is used. As before, this procedure is employed when the small circle is so eroded that even correlation may not yield a sufficiently accurate location. The procedure differs from that of the large circle in that the radius of the circular locus is now equal to that of a nominal small circle.

At this point, software program 100 has done its best job to determine the positions of the large and small circles that comprise the fiduciary mark. However, because the software program is not foolproof, it is possible that one or both of these marks were located incorrectly. Indeed, it is possible that the original image consisted only of noise, not of a genuine fiduciary mark. For these reasons, it is necessary to compute the likelihood that a genuine mark was detected. Therefore, small circle detection routine 240 is followed by detection confidence thresholding routine 250.

Detection confidence thresholding routine 250 employs three distinct confidence measures to determine whether the image identified is in fact a fiduciary mark. Due to the physical characteristics of a nominal fiduciary mark shown in FIG. 3 and the physical circumstances under which fiduciary mark system 10 is used as shown in FIG. 1, including the length of the optical path between CCD camera 60 and conveyor 20 and the height of most parcels processed by fiduciary mark system 10, the system has sufficient depth of field such that the size of a nominal fiduciary mark may be considered to be a constant for all parcels processed by fiduciary mark system 10. Thus, the distance between the two circles of a nominal fiduciary mark may also be considered to be a constant. If the distance between the detected large and small circles varies significantly from what is expected, software program 100 concludes that the mark is invalid. Thus, software program 100 computes a confidence $C_{c-c}$ related to the distance d between the two circles' center points:

$$c_{c-c}(d) = u\left[1 - \frac{|d - d_c|}{\Delta_c}\right]$$

In the above equation, $d_c$ is the nominal center-to-center distance, $\Delta_c$ is the deviation from nominal distance at which confidence becomes zero, and u( ) is the unit step function. The above equation generates highest confidence when the two centers are the expected distance apart. As the distance deviates either way from the nominal value, the confidence diminishes linearly.

For each of the detected circles, a confidence value is computed corresponding to the confidence associated with the detection of the circle. $C_L$, is the confidence associated with the large circle; $C_s$ is the confidence associated with the small circle. The calculation of confidence depends upon which detection attempt finally detected the circle. If the first detection attempt was successful, the confidence is set to one. If correlation was used (i.e., second or third detection attempt for the large circle, or second detection attempt for the small circle), the confidence is equal to the normalized percent correlation (i.e., the percent correlation is equal to one for a perfect match). If the Hough Method was used (i.e., fourth detection attempt for the large circle, or third detection attempt for the small circle), the confidence is equal to a normalized value of the accumulator array bin with the maximum value. This confidence is a measure of how much arc is present in the image. If the entire circle is present, the bin reaches its highest possible value, and the confidence is set to one.

A final decision is made as to whether the mark is valid. Various computations may be employed to determine a final confidence, such as various forms of linear and non-linear combinations of the three individual confidence values. For purposes of the preferred embodiment, a conservative approach is taken. The software program 100 computes the final confidence as the minimum of the three individual confidences:

$$C = \min(C_{c-c}, C_L, C_S)$$

The final confidence is compared to a threshold value $T_c$. If the final confidence is below $T_c$, software program 100 concludes that a valid fiduciary mark was not detected within AOI 222. In other words, a poor confidence measure for any of the three measures will result in a failed detection declaration. Otherwise, the mark is declared legitimate, and the final position and orientation are output. Acceptable performance is observed for the preferred embodiment when $T_c$ is equal to 25 percent. This parameter may be varied somewhat without unduly affecting the performance of the present invention.

Thus it will be seen that the present invention provides a highly accurate yet computationally efficient fiduciary mark system, usable with an over-the-belt OCR reader. The system processes a large number of parcels bearing fiduciary marks using low cost components, and ascertains the location and orientation of the destination address on a parcel without relying on a standardized or preprinted label or container. The system reads fiduciary marks that may be affixed to a parcel in the same area as the destination address either before or after the destination address has been written on or attached to the parcel without obscuring the destination address. The system reliably identifies poorly formed or damaged fiduciary marks, and reliably rejects false marks.

It should be understood that the foregoing relates only to the preferred embodiment of the present invention, and that numerous changes may be made therein without departing from the spirit and scope of the invention as defined by the following claims.

What is claimed is:

1. A method of analyzing indicia including a first component having a first optical signature and a second component having a second optical signature, comprising the steps of:

(a) reading said indicia;

(b) storing an image of pixel values corresponding to said indicia in a matrix defining a set of coordinate axes;

(c) a first cropping step wherein said image is reduced to a first area, and then within said first area:

(i) conducting a first series of detection attempts of increasing computational complexity until said first component is successfully detected;

(ii) defining a first point associated with said first component;

(iii) setting to zero the pixel values associated with said first component;

(iv) conducting a second series of detection attempts of increasing computational complexity until said second component is successfully detected;

(v) defining a second point associated with said second component; and (vi) determining the orientation of a vector from said first point to said second point with respect to said first set of coordinate axes.

2. The method of claim 1, wherein step (c) comprises the steps of:

computing a set of projection histograms corresponding to said image, wherein each member of said set of projection histograms corresponds to one axis of said set of coordinate axes;

computing a set of first-filtered projection histograms, wherein each member of said set of first-filtered projection histograms corresponds to a member of said set of projection histograms adjusted to diminish features not corresponding to said indicia;

defining a first set of maximum points, wherein each member of said first set of maximum points corresponds to one axis of said set of coordinate axes, and wherein each member of said first set of maximum points corresponds to the point along its axis having the largest first-filtered projection histogram value;

defining a first set of maximum lines, wherein each member of said first set of maximum lines corresponds to one axis of said set of coordinate axes, and wherein each member of said first set of maximum lines includes the member of said first set of maximum points corresponding to the same axis, and runs parallel to the other axis; and defining around the intersection of the members of said first set of maximum lines a first predetermined configuration.

3. The method of claim 2, wherein said step of computing a set of first-filtered projection histograms comprises convolution of each member of said set of projection histograms with a first triangular kernel.

4. The method of claim 3, wherein said indicia nominally comprises two non-overlapping circles of different diameter, and said first triangular kernel has a maximum dimension approximately equal to the sum of the diameters of each said circle plus the minimum distance between said circles.

5. The method of claim 1, wherein step (c)(i) comprises:
conducting a first detection attempt;
if said first detection attempt fails, conducting a second detection attempt, said second detection attempt having a greater computational complexity than said first detection attempt; and
if said second detection attempt fails, conducting a third detection attempt, said third detection attempt having a greater computational complexity than said second detection attempt.

6. The method of claim 5, wherein said first detection attempt comprises the steps of:
a second cropping step wherein said image is reduced to a second area;
computing the center of mass of the pixel values within said second area;
defining a first region about said center of mass of the pixel values within said second area;
computing the mass of the pixel values within said first region; and
comparing said mass of the pixels values within said first region to the mass of the pixel values within a nominal first component.

7. The method of claim 6, wherein said first region is approximately circular and larger than said nominal first component.

8. The method of claim 6, wherein said second cropping step comprises the steps of:
computing a set of projection histograms corresponding to said image, wherein each member of said set of projection histograms corresponds to one axis of said set of coordinate axes;
computing a set of second-filtered projection histograms, wherein each member of said set of second-filtered projection histograms corresponds to a member of said set of projection histograms adjusted to diminish features not corresponding to said first component;
defining a second set of maximum points, wherein each member of said second set of maximum points corresponds to one axis of said set of coordinate axes, and wherein each member of said second set of maximum points corresponds to the point along its axis having the largest second-filtered projection histogram value;
defining a second set of maximum lines, wherein each member of said second set of maximum lines corresponds to one axis of said set of coordinate axes, and wherein each member of said second set of maximum lines includes the member of said second set of maximum points corresponding to the same axis, and runs parallel to the other axis; and
defining around the intersection of the members of said second set of maximum lines a second predetermined configuration.

9. The method of claim 7, wherein said step of computing a set of second-filtered projection histograms comprises convolution of each member of said set of projection histograms with a second triangular kernel.

10. The method of claim 8, wherein said nominal first component is approximately circular, and said second triangular kernel has a maximum dimension approximately equal to the diameter said first component.

11. The method of claim 5, wherein said second detection attempt comprises the steps of:
performing a first sequence of correlations, each of said first sequence of correlations being performed between pixels encompassed by a first template corresponding to a nominal first component positioned about one of a first plurality of selected pixels, and the pixel values within an area defined by said first plurality of selected pixels;
defining a second plurality of selected pixels associated with the member of said first plurality of selected pixels with the largest correlation;
performing a second sequence of correlations, each of said second sequence of correlations being performed between pixels encompassed by said first template positioned about one of said second plurality of selected pixels, and the pixels within an area defined by said second plurality of selected pixels;
determining a member of said second plurality of selected pixels with the largest correlation;
computing a first correlation measure corresponding to the correlation associated with said member of said second plurality of selected pixels with the largest correlation; and
comparing said first correlation measure to a threshold value.

12. The method of claim 11, wherein the members of said first plurality of selected pixels are spaced a first distance apart from each other, and the members of said second plurality of selected pixels are spaced a second distance apart from each another, and wherein said second distance is less than said first distance.

13. The method of claim 5, wherein said third detection attempts comprises the steps of:
defining a first candidate set of pixels; and then
computing the radial variance of the pixel values associated with said first candidate;
setting to zero all pixel values associated with said first candidate;
defining a second candidate set of pixels;
computing the radial variance of the pixel values associated with said second candidate;
defining a first preferred candidate to be the one among said first and second candidates with a radial variance more nearly approximating the radial variance of a nominal first component;
computing a first variance measure corresponding to the radial variance associated with said first preferred candidate; and
comparing said first variance measure to a threshold value.

14. The method of claim 5, further comprising a fourth detection attempt comprising the steps of:
determining a first set of edge pixel groups, wherein each member of said first set of edge pixel groups comprises pixels forming the edge of a contiguous formation of pixels within said first area; and
comparing members of said first set of edge pixel groups to the edge pixels of a nominal first component.

15. The method of claim 1, wherein step (c)(iv) comprises the steps of:

conducting a first detection attempt;

if said first detection attempt fails, conducting a second detection attempt said second detection attempt having a greater computational complexity than said first detection attempt; and if said second detection attempt fails, conducting a third detection attempt, said third detection attempt having a greater computational complexity than said second detection attempt.

16. The method of claim 15, wherein said first detection attempt comprises the steps of:

a second cropping step wherein said image is reduced to a second area;

computing the center of mass of the pixel values within said second area;

defining a second region about said center of mass of the pixel values within said second area;

computing the mass of the pixel values within said second region; and comparing said mass of the pixel values within said second region to the mass of the pixel values within a nominal second component.

17. The method of claim 16, wherein said second cropping step comprises the steps of:

computing a set of projection histograms corresponding to said image, wherein each member of said set of projection histograms corresponds to one axis of said set of coordinate axes;

computing a set of third-filtered projection histograms, wherein each member of said set of third-filtered projection histograms corresponds to a member of said set of projection histograms adjusted to diminish features not corresponding to said second component;

defining a third set of maximum points, wherein each member of said third set of maximum points corresponds to one axis of said set of coordinate axes, and wherein each member of said third set of maximum points corresponds to the point along its axis having the largest third-filtered projection histogram value;

defining a third set of maximum lines, wherein each member of said third set of maximum lines corresponds to one axis of said set of coordinate axes, and wherein each member of said third set of maximum lines includes the member of said third set of maximum points corresponding to the same axis, and runs parallel to the other axis; and defining around the intersection of the members of said third set of maximum lines a third predetermined configuration.

18. The method of claim 17, wherein said step of computing a set of third-filtered projection histogram comprises convolution of each member of said set of projection histograms with a third triangular kernel.

19. The method of claim 18, wherein said nominal second component is approximately circular, and said third triangular kernel has a maximum dimension approximately equal to the diameter said second component.

20. The method of claim 19, wherein said nominal first component is approximately circular and larger than said second component, and wherein said second region is approximately circular and larger than said nominal second component, and smaller than said nominal first component.

21. The method of claim 15, wherein said second detection attempt comprises the steps of:

performing a third sequence of correlations, each of said third sequence of correlations being performed between pixels encompassed by a second template corresponding to said nominal second component positioned about one of a third plurality of selected pixels and the pixel values within an area defined by said third plurality of selected pixels;

defining a fourth plurality of selected pixels associated with the member of said third plurality of selected pixels with the largest correlation;

performing a fourth sequence of correlations, each of said fourth sequence of correlations being performed between pixels encompassed by said second template positioned about one of said fourth plurality of selected pixels, and the pixel within an area defined by said fourth plurality of selected pixels;

determining the member of said fourth plurality of selected pixels with the largest correlation;

computing a second correlation measure corresponding to the correlation associated with said member of said fourth plurality of selected pixels with the largest correlation; and comparing said second correlation measure to a threshold value.

22. The method of claim 21, wherein the members of said third plurality of selected pixels are spaced a third distance apart from each other, and the members of said fourth plurality of selected pixels are spaced a fourth distance apart from each another, and wherein said fourth distance is less than said third distance.

23. The method of claim 15, wherein said third detection attempt comprises the steps of:

defining a third candidate set of pixels;

computing the radial variance of the pixel values associated with said third candidate;

setting to zero all pixel values associated with said third candidate;

defining a fourth candidate set of pixels;

computing the radial variance of the pixel values associated with said fourth candidate;

defining a second preferred candidate to be the one among said third and fourth candidates with a radial variance more nearly approximating the radial variance of said nominal second component;

computing a second variance measure corresponding to the radial variance associated with said second preferred candidate; and comparing said second variance measure to a threshold value.

24. The method of claim 15, further comprising a fourth detection attempt comprising the steps of:

determining a second set of edge pixel groups, wherein each member of said second set of edge pixel groups comprises pixels forming the edge of a contiguous formation of pixels within said first area; and comparing members of said second set of edge pixel groups to the edge pixels of a nominal second component.

25. The method of claim 1, further comprising the step of computing a net confidence value for the likelihood that an expected indicia has been detected.

26. The method of claim 25, wherein said step of computing a net confidence value comprises one or more of the following steps:

computing a first confidence value by comparing the distance between said first point and said second point to a distance associated with said nominal indicia;

computing a second confidence value by comparing a measure of said first detection step to a first nominal value associated with said nominal first component; or computing a third confidence value by comparing a measure of said second detection step to a second nominal value associated with said nominal second component.

27. The method of claim 26, further comprising the step of computing a net confidence value based on a combination of said first, second and third confidence values.

28. The method of claim 27, wherein said combination is computed by taking the minimum of said first, second and third confidence values.

29. The method of claim 1, wherein said components are approximately circular images of different diameter.

30. The method of claim 1, wherein said step (a) comprises capturing an image of said indicia in a CCD array.

31. The method of claim 1, wherein said step (b) comprises storing said matrix in a computer memory.

32. The method of claim 1, wherein said indicia comprises fluorescent ink.

* * * * *